US011103863B1

United States Patent
Gokhale et al.

(10) Patent No.: US 11,103,863 B1
(45) Date of Patent: Aug. 31, 2021

(54) ACTIVE CATALYSTS SYNTHESIZED BY HYDROTHERMAL METHODS

(71) Applicants: Rohan Gokhale, Albuquerque, NM (US); Plamen Atanassov, Santa Fe, NM (US)

(72) Inventors: Rohan Gokhale, Albuquerque, NM (US); Plamen Atanassov, Santa Fe, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 391 days.

(21) Appl. No.: 15/943,360

(22) Filed: Apr. 2, 2018

Related U.S. Application Data

(60) Provisional application No. 62/479,393, filed on Mar. 31, 2017.

(51) Int. Cl.
*B01J 37/08* (2006.01)
*B01J 35/10* (2006.01)
*B01J 23/745* (2006.01)
*B01J 37/04* (2006.01)

(52) U.S. Cl.
CPC .......... *B01J 37/084* (2013.01); *B01J 23/745* (2013.01); *B01J 35/108* (2013.01); *B01J 37/04* (2013.01)

(58) Field of Classification Search
CPC ........ B01J 23/745; B01J 35/108; B01J 37/04; B01J 37/084
See application file for complete search history.

(56) References Cited

U.S. PATENT DOCUMENTS

2005/0079120 A1* 4/2005 Fujita .................. C01B 32/15
423/448
2016/0074849 A1* 3/2016 Jiang .................. B01J 35/0006
502/74

* cited by examiner

*Primary Examiner* — Brian A McCaig
(74) *Attorney, Agent, or Firm* — Gonzales Patent Services; Ellen M Gonzales

(57) ABSTRACT

Methods for synthesis of active M-N—C catalysts utilizing thermo-chemical synthesis of chemically defined precursors and materials made thereby.

9 Claims, 4 Drawing Sheets

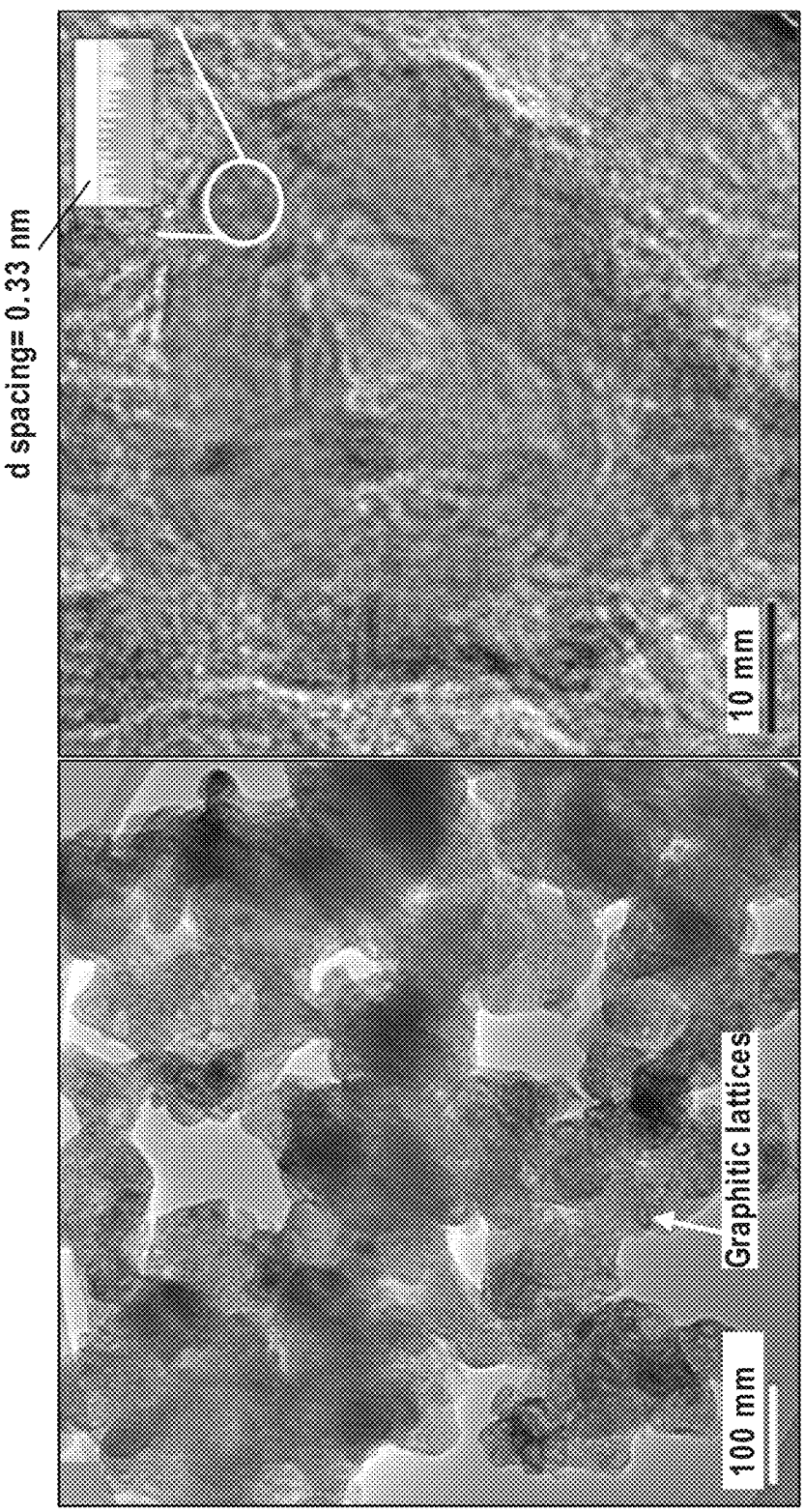

ACTIVE CATALYSTS SYNTHESIZED BY HYDROTHERMAL METHODS

CROSS-REFERENCE TO RELATED APPLICATIONS

The following application claims benefit of U.S. Provisional Application No. 62/479,393, filed Mar. 31, 2017, which is hereby incorporated by reference in its entirety.

BACKGROUND

Fuel cell technology is becoming an increasingly important mode of energy generation throughout the world. One of the largest hurdles to implementation of fuel cell technology is cost associated with expensive platinum-based catalysts. Accordingly, there has been substantial effort devoted to producing non-platinum-based fuel cell catalysts that provide sufficient performance at lower costs.

Previous efforts to produce platinum group metal-free (PGM-free) catalysts have focused largely on Metal-Nitrogen-Carbon (M-N—C) and specifically Iron-Nitrogen-Carbon (Fe—N—C) catalysts[1] which utilize methods such as the reduction of graphene oxide from a graphene oxide precursor,[2] pyrolysis of natural products,[3] polymers,[4] aerogels,[5] metal-organic frameworks,[6] and templated precursors[7] with a wide range of metallic and organic precursors.

One methodology that has been particularly successful is developing M-N—C catalysts is the sacrificial support method described, for example, in U.S. Pat. Nos. 9,634,331, 7,670,988, 9,359,681, 7,678,728, and 9,673,456, This method results in a non-uniform porous material formed by the incorporation of a sacrificial support material, such as silica nanoparticles, within the catalyst precursor and removal of the sacrificial materials using, for example a hydrofluoric acid or a strong base. However, it is also desirable to develop methodologies that do not require the use of corrosive chemicals.

Accordingly, there is a continued desire for relatively inexpensive, PGM-free catalysts with performance specifications that are competitive with expensive platinum-based catalysts.

SUMMARY

The present disclosure provides novel methods for synthesis of active M-N—C catalysts and novel catalysts produced thereby. According to various embodiments, the methods utilize thermo-chemical synthesis of chemically defined precursors to produce a de novo catalytic material.

BRIEF DESCRIPTION OF THE DRAWINGS

FIG. 3 is a low-resolution Transmission Electron Microscopy (TEM) image for GLU-IMID-C-5 showing morphology with assembly of graphitic layers.

FIG. 4 is a high-resolution TEM image for GLU-IMID-C-5 showing the graphitic nano-layers with d-fringes.

DETAILED DESCRIPTION

Figure 1:
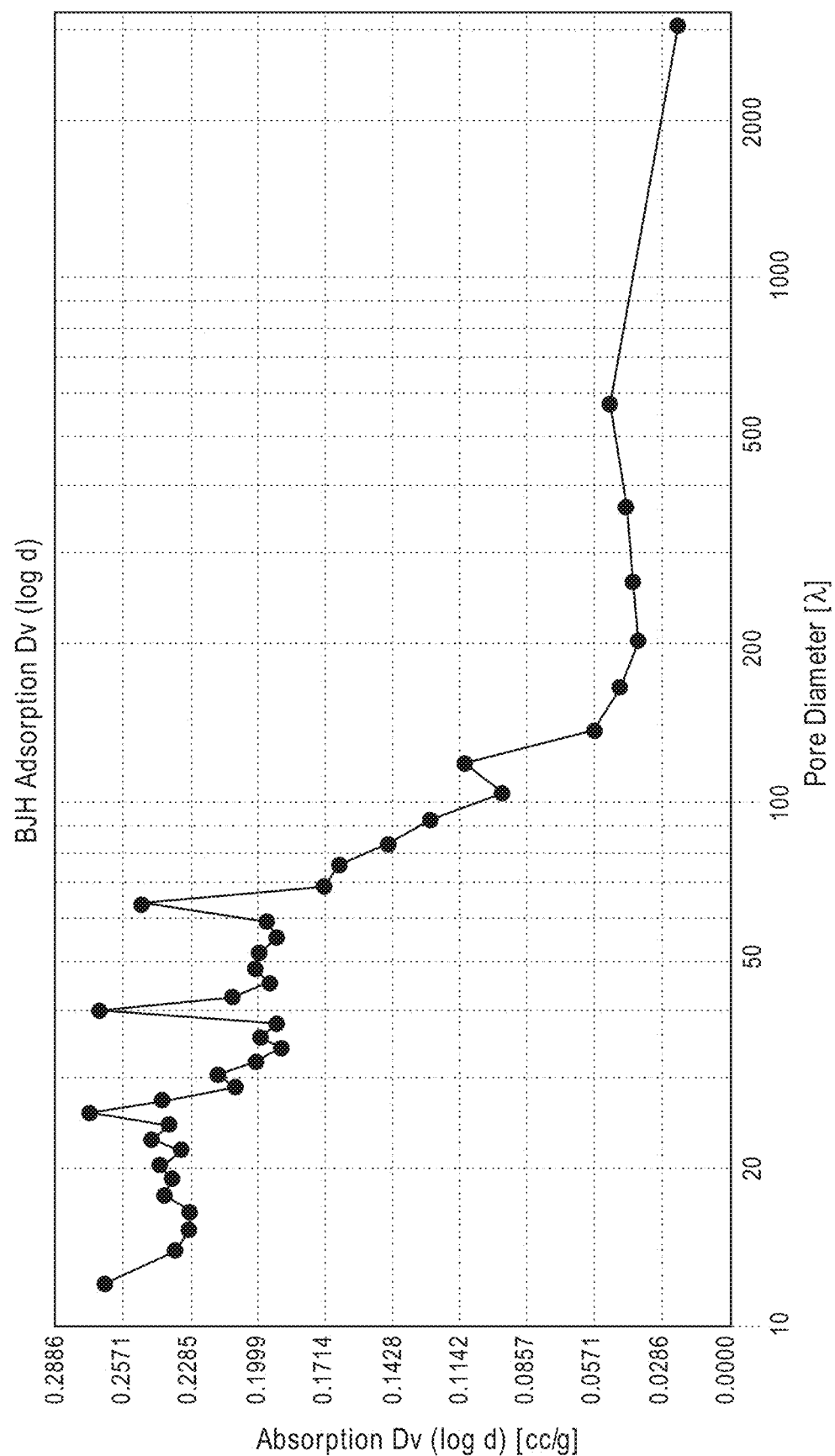
FIG. 1 is X-Ray Diffraction (XRD) patterns showing the pore size distribution for GLU-IMID-C1 and GLU-IMID-C2 catalysts produced using the methods disclosed herein.

According to an embodiment the present disclosure provides a novel method for synthesis of active M-N—C catalysts and novel catalysts produced thereby. According to various embodiments, the method utilizes thermo-chemical synthesis of chemically defined precursors to produce a de novo catalytic material. For the purposes of the present disclosure, the term "thermo-chemical synthesis" is intended to mean synthesis that uses chemical reactions and high temperature simultaneously, or in different steps of the same synthesis. In some cases, thermo-chemical synthesis may also be referred to as "reactive synthesis." As used herein, "de novo" material refers to a material that is generated via a process that begins with chemically defined precursors, as opposed to materials-based precursors. "Chemically defined precursors" are precursors which are defined by their chemical make-up and which do not allow for "material level variability," such as a difference in pore size or morphology. Accordingly, silica, alumina, metal organic frameworks, etc. would not be considered chemically defined precursors.

According to a first embodiment, the present disclosure provides a one-step thermo-chemical synthesis method wherein a chemically defined porosity creating agent (also referred to herein as a pore forming agent) and M-N—C precursors undergo hydrothermal synthesis (also referred to herein as hydrothermal carbonization) resulting in "in situ" creation of catalytic centers in the catalytic material. This in situ process results in the incorporation of nitrogen moieties into carbon matrices as they are formed. Hydrothermal synthesis/carbonization and post pyrolysis is a known method for carbon synthesis and has also been used to create metal imidazolate frameworks.[9-18] However, hydrothermal carbonization has not historically been used to produce carbon-based fuel catalysts because the hydrothermal carbonization typically results in the production of a high percentage (i.e. greater than 80%) of amorphous carbon which is not desired for fuel cell catalyst applications due to lower conductivity for electrons and higher degradation under corrosive conditions. The present disclosure, however, provides a novel synthesis methodology which surprisingly results in the high yield (i.e. greater than >50%) of graphitic carbon, which, unlike amorphous carbon, is highly desired in fuel cell catalyst applications. In general, amorphous carbon has no crystalline order in terms of the macrostructure of the material. Graphitic carbon, on the other hand, has a long-range or short range crystalline order (layer-by-layer stacking) similar to, but not as extensive as, crystalline graphite.

According to various embodiments, the pore creating agent is metal salt wherein the metal has the following properties: evaporates/unstable at a temperature of less than 950° C. Examples of suitable metals include, for example, zinc, cadmium, mercury, potassium, and sodium. Examples of suitable metal salts include, for example, zinc nitrate hexahydrate.

The M-N—C materials are typically provided as some combination of a doping agent (i.e. nitrogen source), a carbon source, and a metal source. Of course it should be understood that while various examples may describe any or all of the M-N—C precursors (and/or the pore creating agent) as being provided individually, it is also possible to substitute or include chemical compounds containing various combinations of nitrogen (or other doping agent), carbon, non-platinum group or transition metal precursors (including platinum group metals), and non-pore forming agents. Furthermore, as shown below as well as in the Examples section, various components, such as nitrogen, may be provided as part of multiple precursors.

The doping agent may be any suitable nitrogen-containing compound including, but not limited to, imidazole, N-Phenyl-1-naphthylamine, Melamine, 4-Aminoantipyrine, Poly (acrylamide-co-diallyldimethylammonium chloride), Poly (2-ethyl-2-oxazoline) etc. It should be noted that nitrogen may alternatively or additionally be introduced as part of a metal or other salt or other chemical reagent/precursor.

The carbon source may be any suitable carbon precursor including, for example, glucose, sucrose, fructose or other carbohydrates. It should be noted that for the embodiments which are described as producing a "de novo," catalytic material, the carbon source is added as a chemical precursor, and not as, for example, preformed carbon particles or templates. However, it will be understood that the presently described methodology could incorporate the use of carbon particles, templates, etc. and that such methodology and materials resulting there from are considered to be within the scope of this disclosure, even though such a method would not be considered to produce a "de novo" catalytic material.

The catalyst precursor may be a metal salt comprising any suitable platinum or non-platinum group metal that is capable of catalyzing the reactions for which the final catalytic material is to be used. According to a specific embodiment, the catalyst precursor may include one or more transition metals such as, though not necessarily limited to, Fe, Co, Mn, Cu, Mo, Ni, Ru, Ta, Ti, V, W, and Zr. It will be noted that while many of the examples herein refer to the use of iron as the transition metal, other transition metals, including those identified above, can be substituted in place of iron, by simply using precursors of those metals instead. Exemplary transition metal precursors include, but are not limited to iron nitrate, iron sulfate, iron acetate, iron chloride, manganese nitrate, copper nitrate, ammonium molybdate, nickel nitrate, ruthenium chloride, tantalum isopropoxide, titanium ethoxide, vanadium sulfate, ammonium tungstate and zirconium nitrate. Furthermore, according to some embodiments the presently described methodologies may utilize precursors of two or more metals to produce multi-metallic catalysts.

According to an exemplary embodiment, a reaction mixture is formed from dissolving the porosity creating agent and M-N—C precursors in a suitable solvent. It will be appreciated that the relative amounts of each chemical precursor can substantially alter the properties of the final materials, as discussed in greater details in the Examples section. Accordingly, the specific amounts used may be determined based on the specific chemicals used and desired characteristics of the final product. However, for a material formed from glucose, 2 methyl imidazole, iron (III) nonahydrate, and zinc nitrate hexahydrate, it was found that molar ratios between 0.5-2 for 2-methyl imidazole: between 0.04-0.12 iron (III) nonahydrate: between 2-8 zinc nitrate hexahydrate, with respect to glucose, formed useful materials. Examples of suitable solvents include, for example, deionized water.

The reaction mixture is then placed in an autoclave or other suitable instrument for hydrothermal synthesis. According to various embodiments, hydrothermal synthesis may be conducted at between 110 and 280° C. for between 0.5 and 2 hours, or until carbonization is achieved. It will be understood that the specific temperatures and times may depend upon the reactants and instruments used as well as external conditions such as pressure or altitude.

After hydrothermal synthesis, the carbonized product is recovered, heat treated, ground, washed, and then heat treated again. Heat treatment may be pyrolyzation between 900 and 950° C. for between 30 and 90 minutes, or until catalyst formation.

Additional details and specific exemplary methods are shown and described in the accompanying Experimental section and Drawings.

As described in greater detail in the Results section, the material resulting from the presently described process has unique morphological and performance characteristics that are unachievable using other methodologies. For example, it appears that the presence of zinc in hydrothermal synthesis results in a number of interesting and previously unknown and unpredicted phenomena. Specifically, the formation of mesopores in the 2-50 nm range, the formation of graphitic rather than amorphous carbon, and the formation of gamma iron. Interestingly, zinc has been previously described as a pore forming agent in connection with zinc-metal-organic rotaxane frameworks (Z-MORFs), these applications resulted in atomically dispersed nanopores in the 2-4 nm range. Prior belief has been that zinc's instability at high temperatures would prevent the formation of pores any larger than this size. However, the unique combination of chemicals and conditions in the presently described method results in pores in the 20-30 nm range. It is believed that the conditions provided by hydrothermal synthesis enable the zinc to initially reduce to zinc particles which are stable long enough to allow a carbon structure to form around them, after which they evaporate, resulting in the mesoporous material described herein.

Equally surprising, is the unexpected formation of graphitic rather than amorphous carbon. As stated above, it has long been held that hydrothermal synthesis was an inappropriate approach for producing catalytic material because it typically results in a high yield of amorphous carbon. However, as demonstrated in the Results section below, the method described herein results in primarily graphitic carbon. It is believed that the process of zinc sublimation that occurs during the process burns the amorphous carbon away, resulting in the presence of graphitic carbon. Moreover, and again as explained in more detail in the Results section below, in some embodiments, the graphitic carbon includes structural properties that are more similar to carbon nanotubes, which can effectively increase the conductivity and rate of electron transfer in the microstructure, and then better performance by the catalyst.

Gamma (also referred to as austenitic or FCC) iron is an allotropic form of iron that typically exists between 910° C. and 1400° C. having a face-centered lattice. Surprisingly, as demonstrated in the Results section below, the presently described method resulted in the presence of gamma iron in the final material. This results in increased stabilization of the catalytic material (i.e. the iron) due to lattice matching between the graphitic carbon and the gamma iron.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

1. M. Shao, Q. Chang, J.-P. Dodelet, R. Chenitz, *Chemical Reviews* 2016, 116, 3594-3657
2. Monteverde Videla, A. H. A.; Ban, S.; Specchia, S.; Zhang, L.; Zhang, J., Non-noble Fe-NX electrocatalysts supported on the reduced graphene oxide for oxygen reduction reaction. *Carbon* 2014, 76, 386-400.
3. R. Gokhale, S. M. Unni, D. Puthusseri, S. Kurungot, S. Ogale, *Physical Chemistry Chemical Physics* 2014, 16, 4251-4259.
4. a) Y. Chen, R. Gokhale, A. Serov, K. Artyushkova, P. Atanassov, *Nano Energy* 2017, 38, 201-209; b) G. Wu, K. L. More, C. M. Johnston, P. Zelenay, *Science* 2011, 332, 443; c) K. Kreek, A. Sarapuu, L. Samolberg, U. Joost, V. Mikli, M. Koel, K. Tammeveski, *ChemElectroChem* 2015, 2, 2079-2088.
5. K. Strickland, E. Miner, Q. Jia, U. Tylus, N. Ramaswamy, W. Liang, M.-T. Sougrati, F. Jaouen, S. Mukerjee, *Nature Communications* 2015, 6, 7343
6. W. Yang, T.-P. Fellinger, M. Antonietti, *Journal of the American Chemical Society* 2011, 133, 206-209.
7. a) R. Gokhale, Y. Chen, A. Serov, K. Artyushkova, P. Atanassov, *Electrochimica Acta* 2017, 224, 49-55; b) R. Janarthanan, A. Serov, S. K. Pilli, D. A. Gamarra, P. Atanassov, M. R. Hibbs, A. M. Herring, *Electrochimica Acta* 2015, 175, 202-208; c) U. Martinez, A. Serov, M. Padilla, P. Atanassov, *ChemSusChem* 2014, 7, 2351-2357; d) C. Santoro, F. Soavi, A. Serov, C. Arbizzani, P. Atanassov, *Biosensors and Bioelectronics* 2016, 78, 229-235; e) D. Sebastián, V. Baglio, A. S. Aricò, A. Serov, P. Atanassov, *Applied Catalysis B: Environmental* 2016, 182, 297-305.

EXAMPLES

Synthesis of Glucose-Imidazole-Carbon (GLU-IMID-C)

GLU-IMID-C-1: 2 g Glucose was dissolved in 50 ml deionized water followed by the addition of 1 g of 2 methyl imidazole, 1 g zinc nitrate hexahydrate, and 0.2 g iron (III) nitrate nonahydrate. The reaction mixture was then reacted in a hydrothermal autoclave at 200° C. for 24 h. The carbonized product was then obtained by centrifugation, pyrolyzed at 950° C. for 45 mins in N2 (7% H2) atmosphere at a 10° C./min temperature ramp rate increase. The obtained product was then ground in mortar pestle and washed for 12 h in dilute nitric acid, separated by centrifugation and washed. A second heat treatment was provided at 950° C. in ammonia for 30 mins. GLU-IMID-C-2: A similar process was followed with the following change in the precursor amounts. 2 g of 2 methyl imidazole, 2 g zinc nitrate hexahydrate, and 0.4 g iron (III) nitrate nonahydrate. GLU-IMID-C-3: A similar process was followed with the following change in the precursor amounts. 4 g of 2 methyl imidazole, 4 g zinc nitrate hexahydrate, and 0.6 g iron (III) nitrate nonahydrate. GLU-IMID-C-4: A similar process was followed with the following change in the precursor amounts. 2 g of 2 methyl imidazole, 4 g zinc nitrate hexahydrate, and 0.4 g iron (III) nitrate nonahydrate. GLU-IMID-C-5: A similar process was followed with the following change in the precursor amounts. 2 g of 2 methyl imidazole, 2 g zinc nitrate hexahydrate, and 0.2 g iron (III) nitrate nonahydrate.

Characterization

Transmission Electron Microscopy (TEM) imaging was performed on a JEOL 2010F instrument using a copper grid. X-ray Photoelectron Spectroscopy (XPS) spectra were acquired on a Kratos Axis Ultra DLD X-ray photoelectron spectrometer using an Al Kα source monochromatic source. The operating pressure was about 2×10−9 Torr. Survey and high resolution spectra were acquired at pass energies of 80 eV and 20 eV, respectively. X-ray diffraction (XRD) was carried out using a Scintag Pad V diffractometer (Bragg-Brentano geometry) with DataScan 4 software (from MDI, Inc.). Micromeritics Gemini 2360 is used to get surface areas via Brunauer-Emmett-Teller (BET) analysis.

Electrochemical characterization was carried out using Pine Instruments analytical system. Working electrodes were prepared by mixing 5 mg of GLU-IMID-C samples with 850 µL of DI water and 150 µL of 0.5 wt % Nafion solution. The mixture was ultrasonicated, and 10 µL was applied onto a glassy carbon Rotating Ring-Disk Electrode (RRDE) three times. The loading of the catalyst was ~0.6 mg cm-2. The electrolytes used were O2 saturated 0.5 M H2SO4 and 0.1 M KOH, Ag/AgCl and Hg/HgO were used as the reference electrodes, respectively. The potentials were converted to reversible hydrogen electrode (RHE).

Results and Discussion

FIG. 1 is the X-ray diffraction (XRD) patterns showing pore size distribution for the GLU-IMID-C1 and GLU-IMID-C2 samples. The XRD patterns show a wide distribution in the mesopore range. In viewing the XRD data it can be seen that GLU-IMID-C1 to GLU-IMID-C2 have pore sizes that range from approximately 0.5→50 nm.

Figure 2:
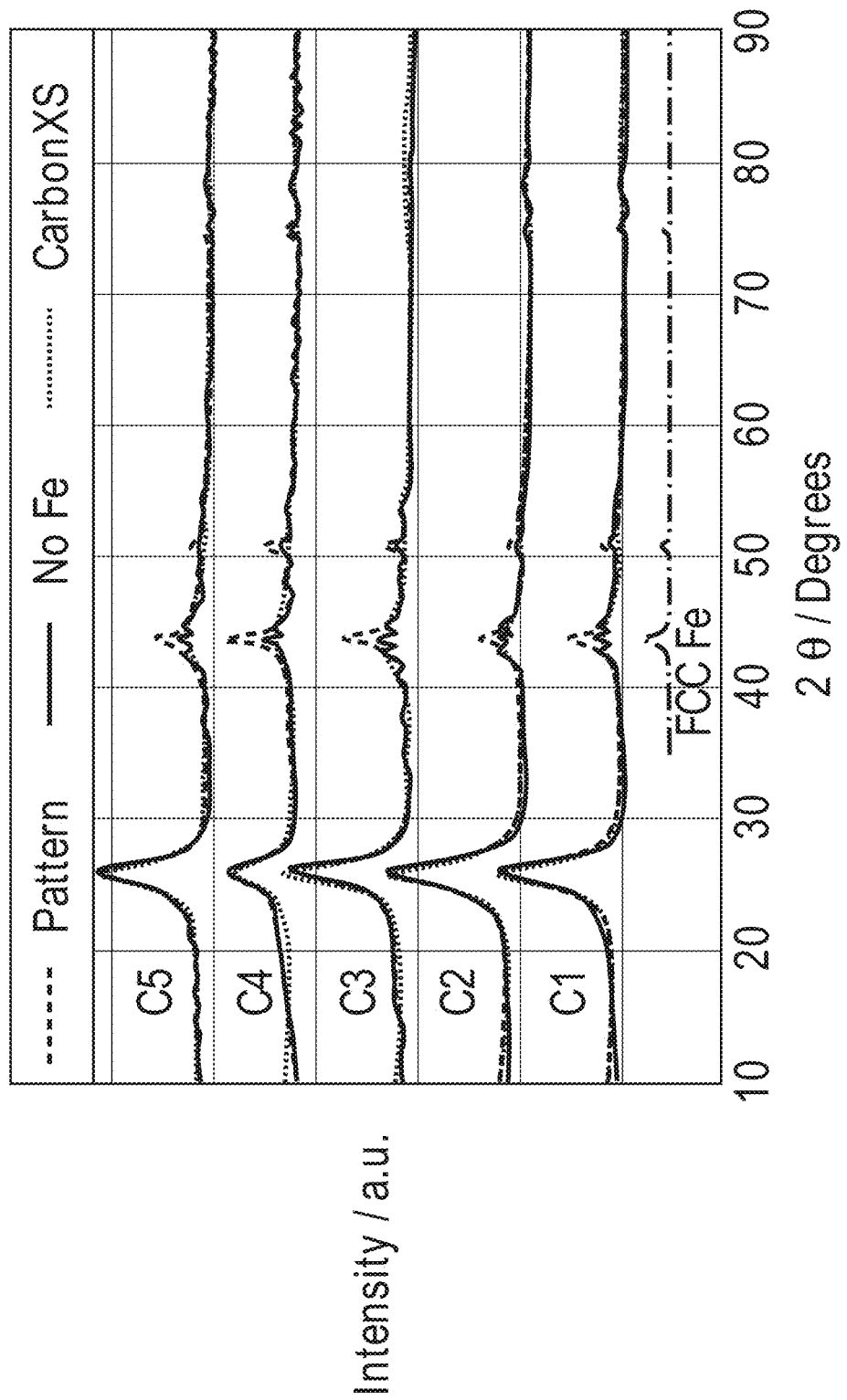
FIG. 2 is XRD patterns for GLU-IMID-C1 to GLU-IMID-C5 showing the presence of austenitic Fe.

FIG. 2 shows XRD patterns for the five GLU-IMID-C1 to GLU-IMID-C5 samples. The fitted pattern for austenitic Fe isolated from sample C1 is plotted at the bottom of the graph. The term "pattern" indicates the original diffraction data corrected by background subtraction. "No Fe" indicates the patterns with Fe diffraction peaks removed. "Carbon XS" indicates the fit obtained using the Carbon XS software. These patterns show the presence of both amorphous carbon (peak at 25 degrees) and austenitic iron (peaks at 43 degrees, 52 degrees, and 74 degrees. It is noted that the FCC-Fe phase should be stable only at temperatures above 911° C., but in these samples, the FCC-Fe is stable at room temperature.

TABLE I

| Catalysts | Fe Lattice Constant (Å) | Fe Crystallite Size (nm) | La (nm) | Lc (nm) | Fraction of Low Strain C |
|---|---|---|---|---|---|
| GLU-IMID-C1 | 3.59 | 12 | 49.3 | 9.3 | 0.76 |
| GLU-IMID-C2 | 3.59 | 11 | 50.6 | 8.6 | 0.77 |
| GLU-IMID-C3 | 3.59 | 13 | 48.7 | 9.6 | 0.80 |
| GLU-IMID-C4 | 3.60 | 11 | 45.7 | 17 | 0.67 |
| GLU-IMID-C5 | 3.59 | 15 | 49.9 | 18 | 0.71 |

Table I shows the quantitative results of fitting from a combined Jade and Carbon analysis. The lattice constants for Fe were all 3.59 Å, consistent with the expected lattice constant for FCC-Fe at room temperature.[16] The average crystallite size was between 11-15 nm which matches what is observed by TEM in FIG. 3. The synthesis parameters do not affect either the lattice constant or the crystallite size for Fe. CarbonXS analysis indicates that the carbons are composed of thin plate-like crystallites with lateral coherence length between 45-50 nm while the vertical coherence length is only 9-18 nm, corresponding to a number of layers that varies between 30-50. The amount of low-strain carbon was found to lie between 67 and 80%. The samples with the strongest carbon peaks, C2 and C3, are associated with the highest fraction of low-strain carbon. No apparent correlation with the synthesis conditions and the structural properties of these five carbon samples is observed.

Figure 5:
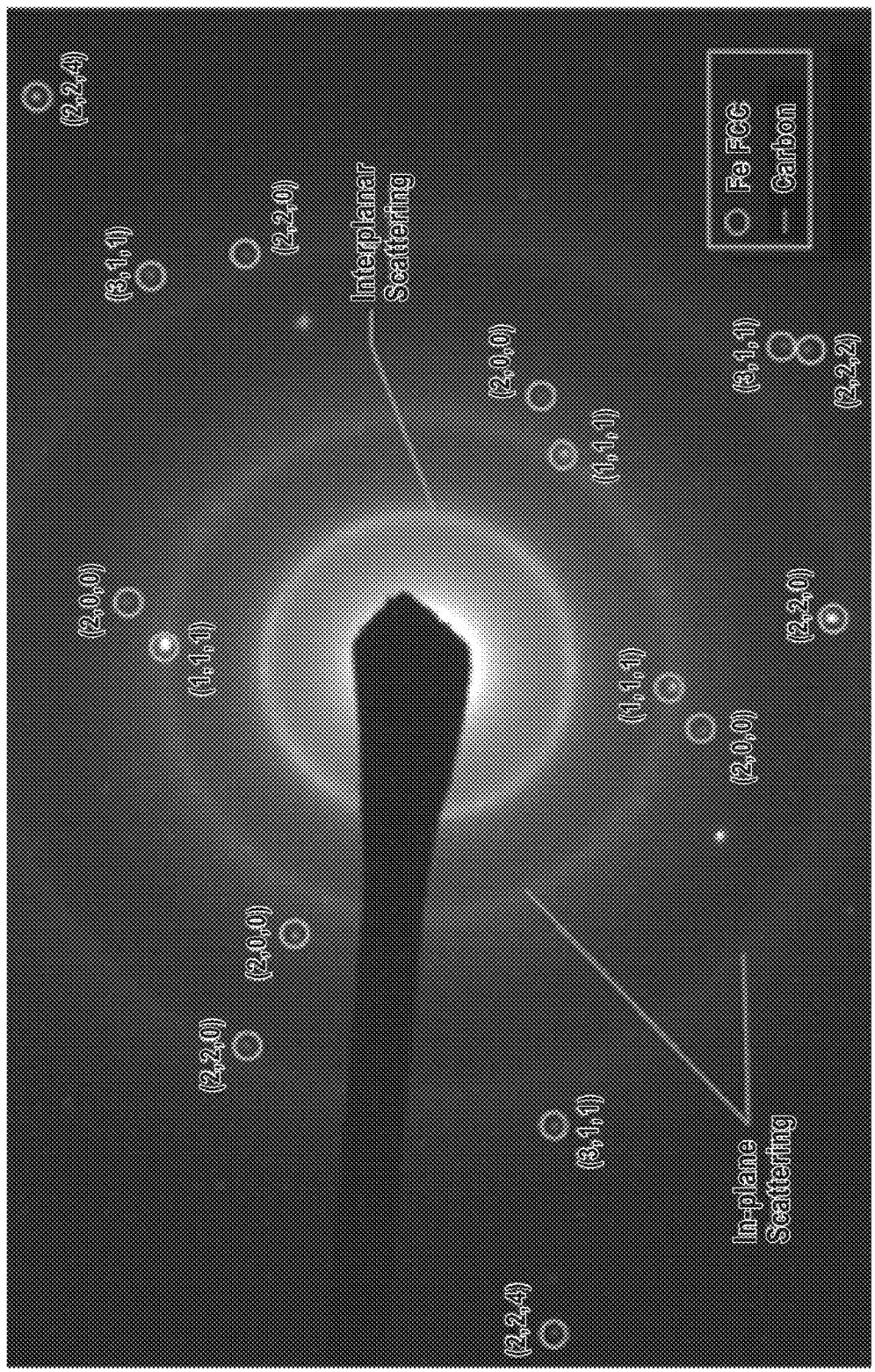
FIG. 5 is an electron diffraction pattern showing the rings from scattering of disordered carbon and FCC iron nanoparticle spots.

Transmission electron microscopy (representative images on GLU-IMID-C-5) confirms that the morphology of these powders includes a partially graphitic carbon matrix in which nanoparticles of Fe are embedded (darker regions in the image) (FIG. 3). This carbon structure is in the form of spherical particles with onion-like graphitic layers. High-resolution imaging (FIG. 4) shows the circular onion-like graphitic nano-lattice structure in detail. The interlayer d-spacing is observed to be 3.3 Å which is characteristic of turbostratic disordered graphitic stacking and confirms the previous structural analysis. From the electron diffraction, (1,1,1), (2,0,0), (2,2,0), (3,1,1), (2,2,2) and (2,2,4) planes have been found which confirms the presence of iron FCC crystals where the crystal lattice parameter for iron FCC is 3.515 Å. Iron particles were mixed in the carbon graphitic structures at very low proportion. The diffraction rings (as shown in FIG. 5) are mainly created by the in-plane and interplanar scattering through the carbon layers.

What is claimed is:

1. A method for forming a porous catalytic material comprising combining a porosity creating agent, a doping agent, a catalytic material precursor, and a carbon precursor to form a reaction mixture; wherein the porosity creating agent or the catalytic material precursor comprises an iron salt; subjecting the reaction mixture to conditions wherein the porosity creating agent forms particles around which a carbonaceous material is formed and then sublimates to produce a porous graphitic carbon material doped with gamma iron having a pore size distribution of between 2 and 200 nm.

2. The method of claim 1 wherein the porosity creating agent is a volatile metal which evaporates below 950° C.

3. The method of claim 2 wherein the doping agent is a nitrogen precursor and the catalytic material precursor is a precursor of a transition metal.

4. The method of claim 2 wherein the catalytic material is iron.

5. The method of claim 1 wherein the porosity creating agent is selected from the group consisting of zinc, sodium, and potassium.

6. The method of claim 1 wherein the porosity creating agent is zinc.

7. The method of claim 1 further comprising heat treating an isolated carbonized product.

8. The material formed by the method of claim 1.

9. A porous graphitic carbon catalytic material doped with gamma iron, wherein the material has a pore size distribution of between 2 and 200 nm.

* * * * *